(12) United States Patent
Schäfer

(10) Patent No.: US 6,328,257 B1
(45) Date of Patent: Dec. 11, 2001

(54) CRUISE AIRSHIP WITH AN ANCHORING DEVICE AND A HELIUM TEMPERING DEVICE

(76) Inventor: Fritz Peter Schäfer, Senderstrasse 53, Göttingen (DE), D-37077

( * ) Notice: Subject to any disclaimer, the term of this patent is extended or adjusted under 35 U.S.C. 154(b) by 0 days.

(21) Appl. No.: 09/341,488

(22) PCT Filed: Jan. 9, 1998

(86) PCT No.: PCT/EP98/00100

§ 371 Date: Jul. 27, 1999

§ 102(e) Date: Jul. 27, 1999

(87) PCT Pub. No.: WO98/31589

PCT Pub. Date: Jul. 23, 1998

(30) Foreign Application Priority Data

Jan. 16, 1997 (DE) ............................................. 197 01 283
Oct. 17, 1997 (DE) ............................................. 197 45 893

(51) Int. Cl.⁷ ...................................................... B64B 1/02
(52) U.S. Cl. ............................................. 244/30; 244/24
(58) Field of Search ............................... 244/24–27, 29, 244/30, 61, 94, 96, 125, 128, 36

(56) References Cited

U.S. PATENT DOCUMENTS

| 1,567,703 | 12/1925 | Broyles et al. | 244/115 |
|---|---|---|---|
| 1,603,384 | 10/1926 | Freese et al. | 244/25 |
| 1,679,565 | 8/1928 | Faber | 244/25 |
| 1,741,446 | 12/1929 | Turner | 244/97 |
| 1,822,849 | * | 2/1929 | Ellinger . |
| 2,126,188 | * | 8/1938 | Goetz . |
| 2,191,759 | | 2/1940 | Hilberth | 244/30 |
| 3,185,411 | * | 5/1965 | Gembe | 244/30 |
| 3,533,578 | | 10/1970 | Lesh | 244/30 |
| 4,052,025 | * | 10/1977 | Clark et al. | 244/25 |
| 4,238,095 | | 12/1980 | Slater | 244/115 |
| 4,272,042 | | 6/1981 | Slater | 244/115 |
| 5,110,070 | * | 5/1992 | Hagenlocher et al. | 244/125 |
| 5,285,986 | * | 2/1994 | Hagenlocher | 244/125 |
| 5,294,076 | * | 3/1994 | Colting | 244/96 |
| 5,346,162 | * | 9/1994 | Belie et al. | 244/137.1 |
| 5,810,286 | * | 9/1998 | Matsler | 244/29 |
| 5,823,468 | * | 10/1998 | Bothe | 244/2 |
| 5,890,676 | * | 4/1999 | Coleman et al. | 244/128 |
| 5,906,335 | * | 5/1999 | Thompson | 244/96 |

FOREIGN PATENT DOCUMENTS

| 26 37 254 | 2/1978 | (DE) . |
|---|---|---|
| 28 14 309 | 10/1979 | (DE) . |
| 29 53 229 A1 | 1/1981 | (DE) . |
| 35 08 100 A1 | 9/1986 | (DE) . |
| 1548884 | 7/1979 | (EP) . |

* cited by examiner

Primary Examiner—Peter M. Poon
Assistant Examiner—Kevin Jakel
(74) Attorney, Agent, or Firm—Schnader Harrison Segal & Lewis LLP

(57) ABSTRACT

In a cruise airship whose hull (S) has the form of an ellipsoid, this ellipsoid has three axes of different lengths at right angles to one another, whereby a longitudinal axis (L), which is horizontally oriented in the position for travel, a transverse axis (Q), which is horizontally oriented in the position for travel and at right angle to the longitudinal axis (L), and a vertical axis (H), which is vertically oriented in the position for travel, possess the longest, middle and shortest length respectively.

16 Claims, 7 Drawing Sheets

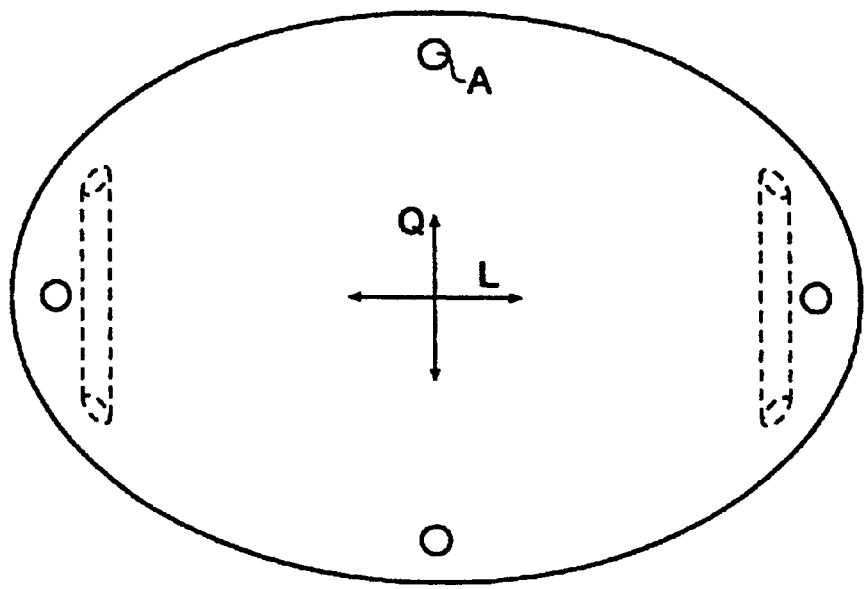
Fig.2A (top view)
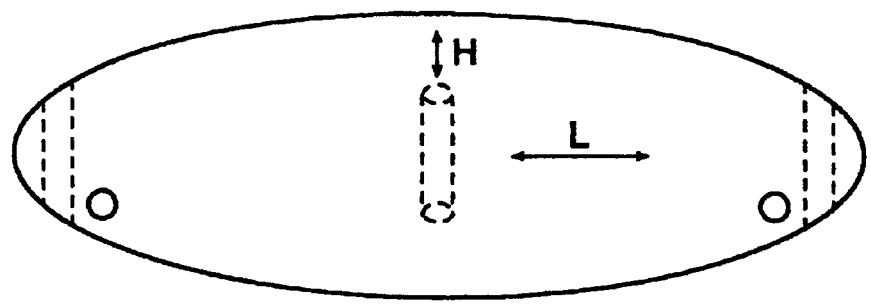
Fig.2B (side view)
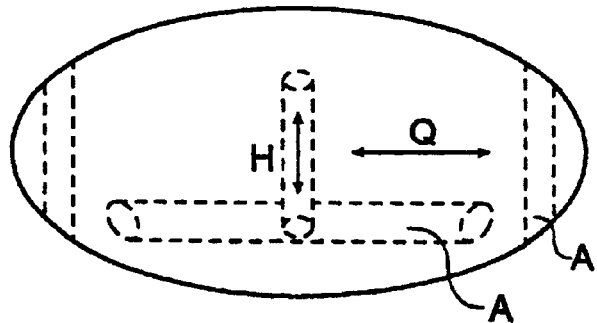
Fig.2C (front view)

CRUISE AIRSHIP WITH AN ANCHORING DEVICE AND A HELIUM TEMPERING DEVICE

FIELD OF THE INVENTION

The invention relates to a rigid airship with an ellipsoid hull that is especially suitable for tourist cruises or expeditionary related travel.

BACKGROUND

The general opinion is that the era of the great rigid airships (Zeppelin) has passed. This is primarily because of the Lakehurst disaster (May 6, 1937), when the airship LZ 129, filled with hydrogen as its buoyant gas, burnt out, and the fact that today's aircrafts are about ten times faster than airships and 20 times faster than ships. Consequently, practically all long-distance passenger traffic is now the realm of aircraft.

The state of the art in airship construction has virtually rested since the end of large airship building in about 1940. The prototypes of all following airships were the last Zeppelins LZ 129 and LZ 130. Although designs for unusual airships were published, in toroidal form for instance (eg DE-OS 28 14 309), they were never actually implemented because of the unsuitability of the structure (eg polyethylene skin for a torus of 400 m in diameter).

For the large airships that emerged since then, the three major problems were as follows:
1. high sensitivity to cross winds because of the form and fins,
2. flying without ballast and/or gas loss, and
3. landing and anchoring.

Ejecting ballast and releasing gas were indispensable in conventional airships. When the airship started, ballast (usually water) was first ejected to allow a sufficiently fast climb to a height of 50 to 100 m, where the propulsion engines were started to bring the airship to its cruising altitude at an angle of climb of about 10° by dynamic lift. As a result of decreasing air pressure with increasing altitude, the buoyant gas in the gas cells expands and thus produces the lift, until it is lowered by releasing gas at the required altitude in order to keep equilibrium with the weight of the airship so that the latter can continue to travel in the normal horizontal position with the least resistance (at 10° angle of incidence the aerodynamic resistance of ellipsoids increases by about a third). Accordingly, the airship has too great a lift for descent and generally cannot descend fast enough only through dynamic downward drift and a negative angle of incidence, so all that remains is to release gas.

Fuel consumption was another difficulty, in that the fuel in the engines of the airships combusted into gaseous products that escaped into the atmosphere creating lift corresponding to the weight of the combusted fuel, which to begin with could only be compensated by releasing buoyant gas. For consumption of 80 t per trip for example, this meant a loss of about 70,000 m$^3$ of buoyant gas through releasing it. Gas loss of this order would be financially unsupportable in the case of the helium that is now prescribed as the buoyant gas.

In LZ 130 this problem was solved by conducting the exhaust gases of the engines through a cooling system in which the water of combustion condensed and entered into the ballast water tanks to compensate quite precisely the weight lost through fuel consumption. However, the cooling system meant extra weight of 4 t and extra fuel consumption of 2 t for a 100 hour trip, with the result that the payload reduced by 6 t.

As another way of avoiding helium losses, DE-OS 28 14 309 mentions the liquefaction of buoyant gas by a gas liquefying plant borne in the airship to aid the descent of a toroidal airship. But this system is bound to the size relations of the airship, which are practically impossible to implement.

Helium, the only practicable buoyant gas for manned airships, is the most difficult gas to liquefy. The only practical solution for large volumes of gas is compression followed by cooling (with the aid of liquid nitrogen) and decompression with external work output. Using this process the Linde-Kryotechnik firm (Winterthur) has implemented systems (drive power of 1850 kW) with capacity of 2400 l of liquid helium per hour. The production of one liter of liquid helium takes about 1 kWh, the consumption of liquid nitrogen in the process already being considered. With these figures one can calculate that, to compensate 80 t weight loss through fuel consumption for example, some 62,000 m$^3$ of helium gas would have to be liquefied. This means, however, that through the power consumption of the system, extra fuel consumption of some 12.5 t results, which in turn would have to be compensated by further liquefaction of helium, while the system for recovery of combustion water would only have extra fuel consumption of 2.5 t, which furthermore compensates itself. So the use of a large helium liquefying plant solely for the purpose of compensating weight loss through fuel consumption is meaningless.

A further problem is that of anchoring airships during and after landing. A common procedure is to throw manropes from the airship to a multi-man team that then pulls the airship to its anchorage and moors it to posts in the ground. Subsequently, for protection against the weather and storms, the airship is towed by a vehicle or the anchor team from where it has moored into a large hangar. Another method is what is called mooring on a high mast, where a locking device in the nose of the airship engages with a matching counterpart on the rotatable tip of a mast about 50 m in height for example. Passengers, crew and freight reach the mast through a walkway and then descend to the ground by an elevator. Both of these procedures are detailed by P. Kleinheins (publisher) in "Die grossen Zeppeline" (Dutsseldorf, VDI-Verlag, 1996).

These procedures cost material, personnel and time. If the appropriate installations do not exist, landing is dangerous and difficult. That is one of the major reasons why airship travel to date, especially by large rigid airships, which is the only category that comes into question for transporting passengers on a large scale, has been so uneconomical, in other words why it has played no role for the past 50 years.

Smaller nonrigid dirigibles (blimps) are also known, for which improvements have been published, eg for magnetic mooring (U.S. Pat. No. 4,238,095 and U.S. Pat. No. 4,272,042) or for liquefaction of the buoyant gas in a gas liquefying plant onboard an extremely large airship to generate downward drift (DE-OS 28 14 309). However, these developments, because of the difference in sizes, are not suitable as stimulus for further developments where large airships are concerned.

In particular, the described landing procedures and installations cannot be scaled to airships with large numbers of passengers (eg some 350) and matched to today's safety regulations for transportation of persons. This also applies to the landing procedure in the above mentioned US patent, which, because of the permanent magnets that are used, is only suitable for small nonrigid dirigibles. An electromagnet on the rubber skin of the nonrigid dirigible is only suggested for mast mooring, this magnet being very low in weight and thus having little magnetic force.

Thus, it would be advantageous to provide an improved rigid airship that exhibits less sensitivity to side winds, with which a large number of passengers can be transported for reduced energy consumption per passenger, and that demonstrates improved maneuverability.

SUMMARY OF THE INVENTION

A cruise airship is characterized in particular by the fact that it has a hull in the form of an ellipsoid with three axes of different length at right angles to one another, has no fins and tail surfaces, is controlled and steered in position by impellers, contains a helium tempering device, and possesses an electromagnetic anchoring device. In contrast to freight airships, the design according to the invention is aimed at transporting a large number of passengers with the necessary comfort and safety.

Advantageous uses of the invention exist in passenger transportation on cruises in particular. The invention will be described in what follows without restriction, especially with reference to passenger traffic. During the past 30 years sea cruises have become popular for recreation and enjoyment. This opens up a new existential basis for large rigid airships as cruise airships. They would provide an ideal supplement to sea cruisers through the possibility of reaching any number of land destinations. Then there is a fact that a cruise airship travels at twice the speed of a ship, meaning that it can reach more destinations during a one-week cruise for example, whereby there is generally interest in being able to land within walking distance of a monument for viewing, an outlook point or the like. Naturally, passengers expect the same kind of luxury as when at sea. For these reasons, from an economical point of view, a certain minimum number of passengers (eg 100 or 300) per cruise airship is necessary, meaning that the size of the airship is already approximated. Considering these dimensions, it is also easy to combine sea and air cruises, eg first a one-week cruise at sea followed by one week cruising in an airship. Then there is the fact that air cruises can also start and end at airports, so the passengers can be flown in for an air cruise. The general logistics for enterprises of this kind are already very advanced in air and sea travel.

BRIEF DESCRIPTION OF THE DRAWINGS

Details of the invention are described in what follows with reference to the attached drawings, showing:

FIG. 2: schematic views of an airship according to the invention with impellers.

DETAILED DESCRIPTION

Figure 1:
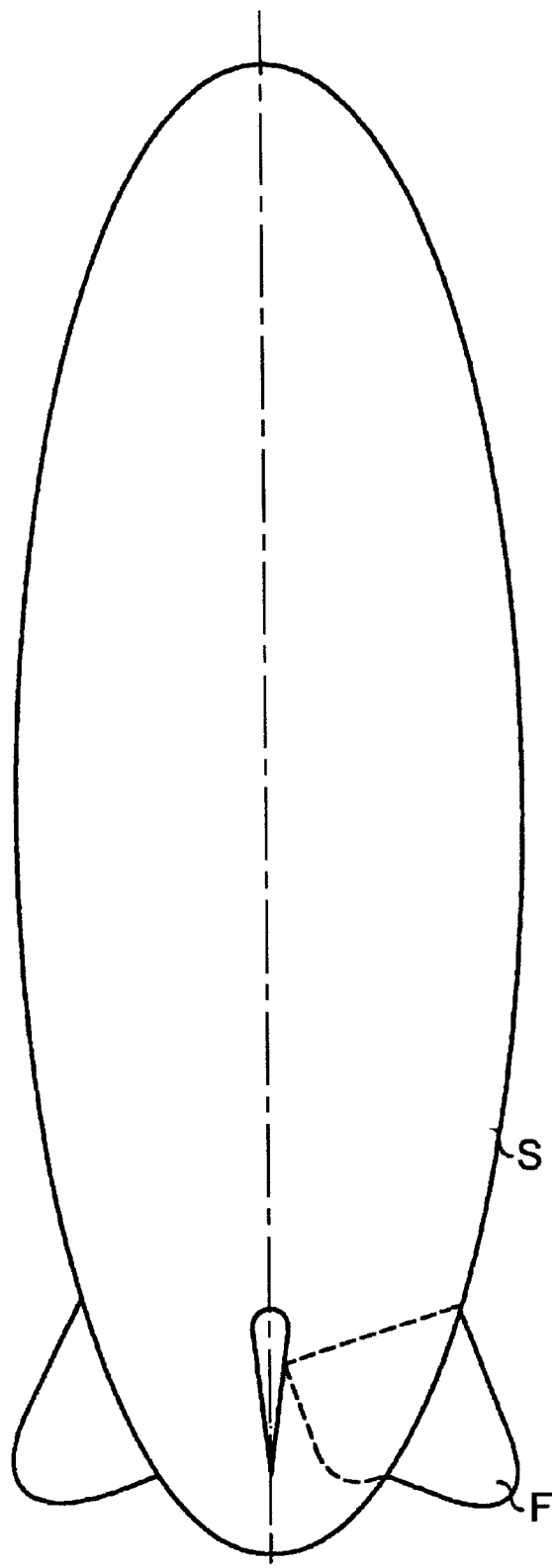
FIG. 1: a schematic side view of an airship according to the invention.

The three major problems mentioned above are solved by a number of measures described singly in what follows taking the airship referred to as EL 1 as an example, although these measures can be implemented singly or combined. Each of the measures calls for consideration of the nature of the solutions proposed for the other two problems, so the invention represents a uniform entity. This can be explained as follows to begin with. The unusual form of the airship, characterized by especially low sensitivity to cross winds, demands absolute avoidance of all extra aerodynamic drag, as would result for example from a magnetic landing device according to the US patents cited above. Furthermore, it simplifies the incorporation of a helium tempering device that in turn simplifies landing by means of the landing device that will be described below. Conventional airship components (eg the design of signaling devices and the like) are not separately described.

The airship according to the invention has a hull S (FIGS. 1 and 2) conceived as an ellipsoid with three axes of different length at right angles to one another. The longitudinal axis L, which is horizontal along the axis of normal travel, is the longest axis, the transverse axis Q, likewise normally horizontal, is of middle length, while the vertical axis H, normally vertical, is the shortest. A possible embodiment has a ratio of axis length of the hull of l:q:h=3:2:1, whereby $l \in (2.5, 3.5)$, $q \in (1.5, 2.5)$ and $h \in (0.5, 1.5)$ may also be taken. To give an impression of the dimensions of a cruise airship for 300 persons, here are the axis lengths of the example that will be used: l=150 m, q=100 m, h=50 m.

The coefficient of drag $c_w$ for general ellipsoids (three different axis lengths) cannot be found in technical literature. However, the coefficients $c_w$ of rotational ellipsoids for incident flow in the direction of the longitudinal axis as a function of the diameter/length ratio can be found in S. F. Hoerner's "Aerodynamic Drag", 1958, page 2, FIG. 19, where this ratio ranges from 0 to 1.4, ie from extremely oblong to moderately oblate ellipsoids including the sphere. The measurements were made at large Reynolds numbers in the region of $10^6$, as also in the case of airships. This function only alters slightly in the range considered here. So, to determine the correct $c_w$ value, one can, to a good approximation, take the geometric mean of width and height $(QH)^{1/2}=D$ instead of the diameter of the rotational ellipsoids if the frontal drag is to be calculated. For transverse flow (sensitivity to cross winds) one takes $(LH)^{1/2}=D$, and for climbing or sinking drag $(LQ)^{1/2}=D$. Thus, from the above diagram, one obtains a coefficient $c_{w1}=0.07$ for frontal drag, $c_{w2}=0.07$ likewise for transverse drag and $c_{w3}=0.10$ for vertical drag. By comparison, the frontal drag of the Zeppelin LZ 129 after experimental measurements is $c_{w4}=0.06$ (axis ratio 6:1), the transverse drag of the hull $c_{w5}=0.07$ and that of the tail surfaces $c_{w6}=1.1$ (flat board).

For the aerodynamic drag the formula is $W=\frac{1}{2} \cdot \rho \cdot v^2 \cdot F_i \cdot c_{wi}$, where $\rho$ is the density of air, $F_i$ and $c_{wi}$ with i=1 to 6 are the biggest cross-sections and the associated coefficients for the above cases.

For the flight resistance, for example, a flight speed of v=100 km/h=27.778 m/s was assumed, and for sensitivity to cross winds likewise v=100 km/h as cross wind. v=1 m/s was assumed for sinking or climbing drag (shortly before landing and after starting). The values determined for drag are listed in Table 1, together with other values, in a comparison between LZ 129 and the ellipsoid airship (EL 1) used here as an example.

The calculated drag values for 100 km/h flight speed yield the engine power $P_{100}$ required for propulsion at this speed according to the formula $P_{100}=W \cdot v$. The actual installed power of the propulsion engines of LZ 129 also produces the, determined as a measured value maximum speed at full engine power of 137 km/h if one multiplies $P_{100}$ by the factor $(137/100)^3=2.571$ (since the required engine power increases to the third power of speed) and with accuracy of about 1%. The computed maximum speed for the assumed power onboard EL 1 is 110 km/h, so that only ¾ of installed engine power is needed at a cruising speed of 100 km/h.

The ellipsoid form chosen for EL 1 with the axis ratio 3:2:1 deviates relatively little from the form of a sphere, which on the one hand very much approximates the volume for a given surface to the optimum of the sphere, and on the other hand considerably reduces sensitivity to cross winds, although at the expense of requiring greater propulsion power. The ratio of installed propulsion power of EL 1 to LZ 129 is 1.81, ie 80% more than that of LZ 129, corresponding to the percentage by which the volume of EL 1 exceeds that of LZ 129. But, given the cruising speed of 100 km/h, selected for an adequate margin from the maximum speed, this is of lesser importance since, as is easily shown, the engine operation costs make little difference in the context of overall operating costs.

Reduction of sensitivity to cross winds in EL 1 compared to LZ 129 is of the utmost significance however, since many misfortunes to date in the operation of large airships can be traced to the effects of cross winds. As listed in Table 1, the resistance offered by EL 1 to a storm of 100 km/h is only ⅓ that of LZ 129, which in no small part is due to dispensing with fins and tail surfaces susceptible to damage. These surfaces were occasionally torn to shreds on the Zeppelins during a storm and had to be repaired en route at the risk of the crew's life. This change means an inestimable advantage for the safety of an airship, something which takes on utmost priority for a cruise airship. The drag when sinking and climbing is the same, to within a few percent, for LZ 129 and EL 1.

At higher traveling speeds (for instance the most practical cruising speed of a cruise airship of about 100 km/h) the gusts and other aerodynamic disturbances to be handled by the impellers demand substantial installed impeller performance. Tail planes (without a rudder!) would achieve dynamic stability about the three major axes, allowing the impeller performance to be reduced considerably. On the other hand, this would mean increased sensitivity to cross winds at low speeds, which was the reason for dispensing with tail planes and rudders.

One idea of the invention is to use retractable tail fins F that are extended wholly or in part when needed at higher speeds, while normally they will be withdrawn inside the ellipsoid so that they do not project or, if so, to an insignificant extent. In the dimensioning of an airship the surfaces would be large enough to support the impellers in achieving dynamic stability at the required speed of travel but not so large that sensitivity to cross winds is unnecessarily increased. Such retractable surfaces that are variable in flight are a known principle in aircraft construction, eg alteration of wing sweep or dipping of the nose on supersonic aircraft, so detailed description of the mechanisms required for such purposes is unnecessary here and proven models can be referred to in later final design. It is possible to use three, four or more tail surfaces.

A further reduction of aerodynamic instability through eddying of flow on the rear third of the surface of the airship can be achieved by small fins attached vertical to the surface and at regular intervals of one to two meters. These roughly triangular fins, about 50 cm at the base and 25 cm in height, are used on large aircraft. FIG. 1 illustrates a steering fin F extended (continuous outline) and retracted (dashed outline) on the hull S of the airship.

Low-lying arrangement of machines, fuels, supplies, etc and even distribution of their weight make it possible to locate the center of gravity of the airship low on the bottom half of the vertical axis, producing a certain aerodynamic stability about the normal flight attitude. Deflections from the path through wind force, shifts of persons and load and the like are dynamically compensated by six impellers, which are also required for intended changes in flight attitude like climbing, descending or flying in a curve. The impellers are preferably electrically powered fans that can be controlled in sense and speed (power approx. 30 to 150 kW) and are placed near the end of the longitudinal and transverse axes. Four impellers near the ends of the longitudinal and transverse axis are arranged in vertical pipes from top to bottom through the entire airship. In this way, depending on the sense of the fan at its location, it is possible to generate lift or downward drift, ie in order to produce tilt when the direction at opposite ends of the axis is different, or lift or downward drift so that the airship will climb or descend, maintaining its attitude, when the direction is the same. For turning the airship about its vertical axis (in a curve), the propulsion engines with propellers arranged conventionally on both sides of the airship in nacelles will be used for the most part, eg with the port propellers rotating fast and the starboard propellers slowly to fly a righthand curve, whereby, of course, the impellers near the ends of the transverse axis automatically or manually bank to match the radius of the curve and the speed of travel. Should flight trials show that sufficiently tight curves cannot be flown in this way, a further identical impeller can be arranged near each of the forward and aft impellers in the form of a horizontal pipe through the airship.

The height of the impellers is preferably as near as possible to the height of the center of gravity, but at the same time, to improve the leverage, as close as possible to the ends of the longitudinal axis, ie a compromise that has to be matched to individual design. The location of six impellers A is shown schematically in pipe form corresponding to the direction in which they act as a plan view in FIG. 2A, as a side view in FIG. 2B and as a front view in FIG. 2C. The number of horizontally or vertically acting or further oblique acting impellers can be matched to the particular construction.

For dimensioning the impellers A, one can, according to the technical literature, proceed from a specific thrust of a single impeller (otherwise called a ducted fan) of at least 30 N/kW (corresponding to about 3 kg lift). So, as a meaningful solution, each of the six impellers would produce 33 kW for a example. In this way the four vertically acting impellers can together produce lift (downward drift) of 400 kg when starting (landing), which is sufficient for a climbing (descending) speed of 2.4 m/s. Naturally, because of the large inert mass of the airship, this speed is not produced until after a delay, when the aerodynamic drag of the airship when climbing at increasing speed, for example, just balances with the lift of the airship through the four impellers. To illustrate the duration of this climbing phase, here are some figures with the start at t=0, where the time t (in s) is followed by the altitude reached h (in m) and the speed v (in m/s) without allowance for aerodynamic drag, because this is initially negligible or only slight for the beginning of ascent: 0/0/0; 10/0.67/0.133; 60/24/0.8; 180/216/2.4. So, after about 5 min, the airship has reached its constant climbing speed governed by aerodynamic drag.

The airship reacts in a correspondingly inert manner to the contrarotating horizontal impellers when a turning motion is to be executed. For approximation purposes the moment of inertia J of the airship about the vertical axis was calculated as that of a circular disk with radius R uniformly subjected to a mass M of 300,000 kg, taking $R^2=a \cdot b$, producing $J=\frac{1}{2} \cdot M \cdot R^2$. The torque produced by the impellers, for a horizontal spacing of the impellers of 60 m, becomes $T=2 \cdot 1000$ N·60 m. The time derivative of the angular velocity ω is produced from $T=J \cdot d\omega/dt$. The calculated values then deliver the angle of rotation (followed in brackets by the arc traversed by the tip of the nose or tail), ie after 10 s: 0.6° (0.8 m), after 1 min: 21° (28.8 m).

These data should suffice, because other cases can easily be calculated in this way to an adequate approximation, for example sideways translation with horizontal impellers rotating in the same direction, or combination of static and dynamic lift through impellers. In any case it can be seen that the examples of dimensioning given for the impellers are sufficient for all normal starting, traveling and landing operations, and how they can be modified to produce different dynamic characteristics of the airship that may be desired.

A particular advantage of this dynamic steering is the fact that it acts for the most part independently of speed, in contrast to conventional steering by tail fins with rudders, which are entirely ineffective at zero speed of travel. This feature of the impellers not only helps to avoid a potential accident source that has played a disastrous role in the history of aviation, it also allows precision landings in a way that is of special advantage for the mooring device described further below.

The volume of the airship EL 1 is derived from the formula $V=(\frac{4}{3}) \cdot \pi \cdot a \cdot b \cdot c$, where $a=\frac{1}{2}$, $b=q/2$ and $c=h/2$ are the lengths of the semi-axes. According to Table 1 it is 80% more than that of LZ 129, although the length of EL 1 is only 61% that of LZ 129, which is very favorable in terms of maneuverability, especially for precision landings.

Figure 3:
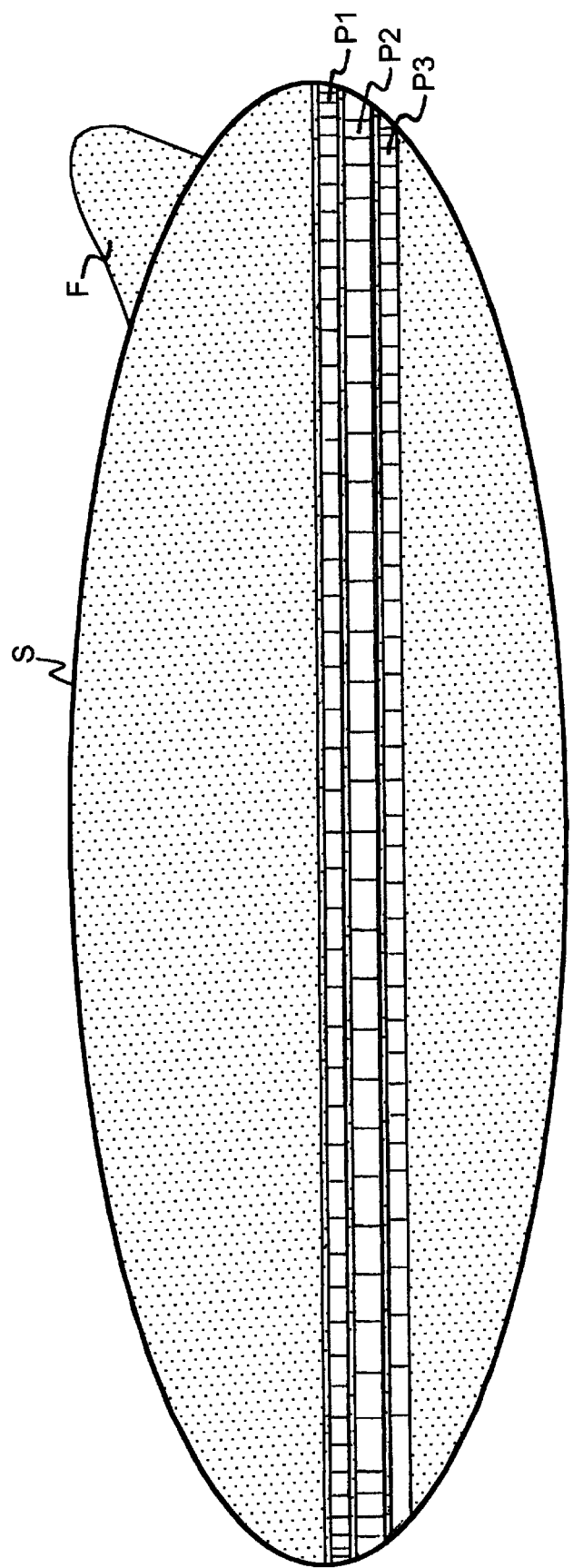
FIG. 3: another schematic side view of an airship according to the invention illustrating the location of the passenger decks.
Figure 4:
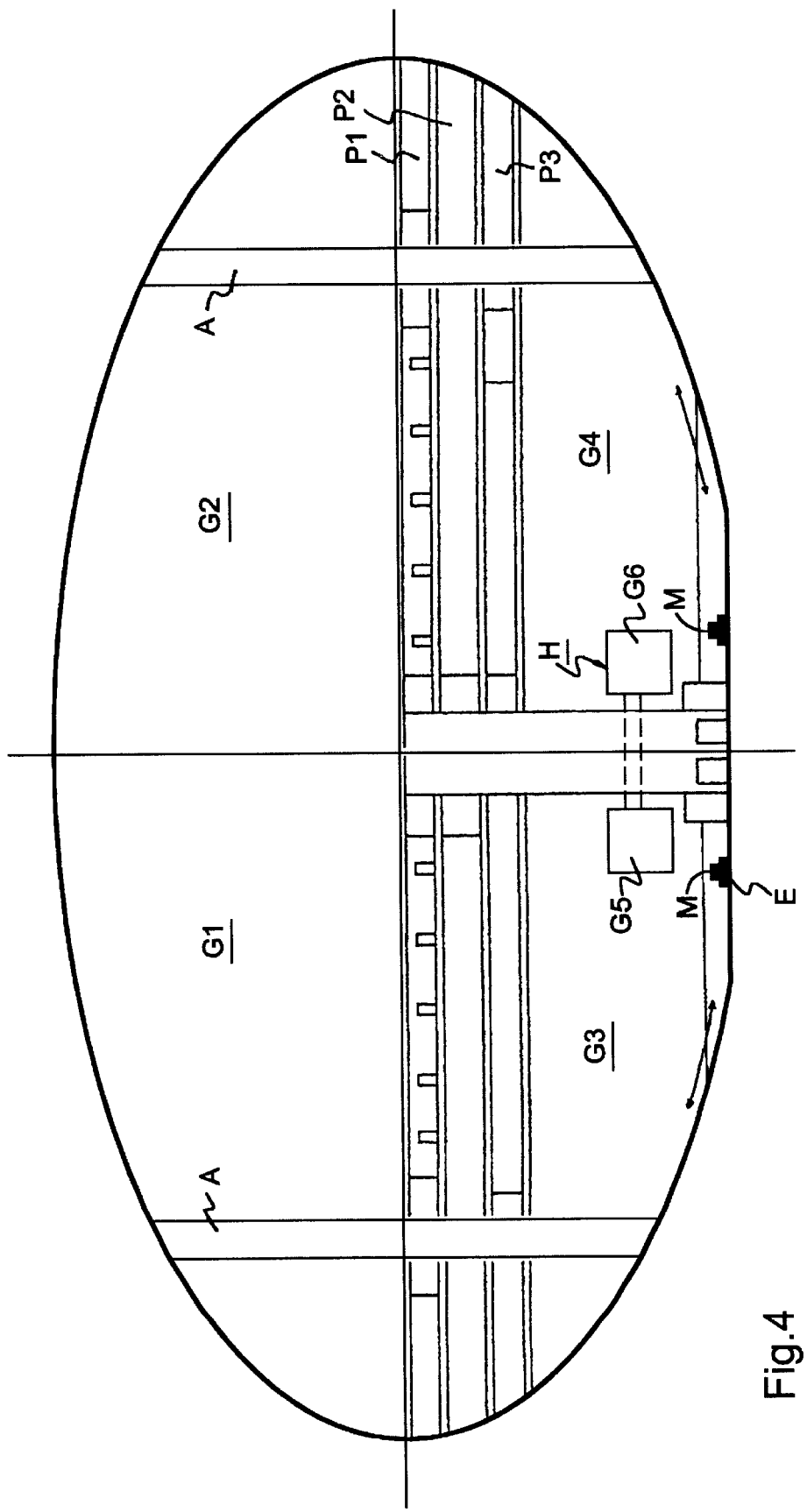
FIG. 4: a sectional view of an airship according to the invention illustrating further details of the airship.

The upper half of the airship EL 1 (volume 196,350 m³ or more than the entire buoyant gas volume of LZ 129) is more or less entirely occupied by permanently filled and sealed buoyant gas cells as shown in FIGS. 3 and 4, which when starting are filled to the extent that they are not taut with helium until the desired traveling or pressure altitude (eg 2500 m) is reached. These gas cells G1, G2 must be produced of material that is resistant enough for the cells not to burst at about 500 m more altitude, but instead so that at an even higher altitude the safety relief valves will trigger and release gas, which should never be necessary, however, given prudent steering of the airship.

The fourth sixth of the airship's height, reckoning downwards, is occupied by two passenger decks one above the other, while in the part below, in as much as it is not taken up by machines, gangways, elevators, supplies, etc, further gas cells will be arranged, which, in contrast to the gas cells above, are connected to a helium tempering device that, as described further below, allows control of lift during travel. The maximum capacity of these gas cells is about 80,000 m³, meaning an overall helium capacity of 275,000 m³, for total lift of 300 t. This lift can be reduced just as required by the helium tempering device described later on.

A further improvement of the cruise airship is the fact that the buoyant gas cells G3, G4 located in the bottom half of the airship below the bottom deck are included with their lift in the calculation of the statics of the cruise airship. The filled or only partly filled gas cells are formed so that their tops are a flat foil fitting against a certain area of the flat and smooth underside of the bottom deck, thus producing a constant supporting force distributed over the entire area that can take the weight of the deck and more. This considerably simplifies calculating the statics of the airship and the structural weight.

Throughout the passenger decks P1, P2 (see FIG. 3), instead of sheet metal, large-area glazing of extremely resistant organic glass, eg Lexan (registered trademark), will be used, which is sufficiently thick and anchored to the skeleton at a sufficient number of places to withstand all stress. This will produce large-area panoramic windows allowing unhindered viewing of the territory flown over, thus making a substantial contribution to the activeness of a cruise by airship.

Throughout the passenger decks, instead of sheet metal, large-area glazing of extremely resistant organic glass, eg Lexan (registered trademark), will be used, which is sufficiently thick and anchored to the skeleton at a sufficient number of places to withstand all stress. This will produce large-area panoramic windows allowing unhindered viewing of the territory flown over, thus making a substantial contribution to the attractiveness of a cruise by airship.

The two passenger decks P1, P2 are split up in such a way, for example, the lower deck P2 (headroom, eg 4.5 m) can be devoted to general facilities (dining rooms with kitchens, salons, gaming rooms, bars, coffee shop, etc) while the upper deck P1 (headroom, eg 2.8 m) will serve for the cabins and suites of the passengers. The lower deck will also contain one or more rooms for the airship's navigation at the foremost point of the nose. The crew of the airship, officers and personnel, will be accommodated in cabins located as close as possible to their jobs, whereby, if wished, these may be in a further deck P3 lower down, separate from the passengers. The distribution of the passenger cabins will preferably be as in modern sea cruisers, for example 150 cabins to hold 300 passengers, two thirds of them (100 cabins) as outer cabins, and one third (50 cabins) as inner cabins. About ten of the outer cabins should be fitted out as large luxury suites. The upper deck has an area of about 11,000 m², the lower deck 10,000 m², meaning that an average of about 60 m² is available for each passenger cabin. The crew should comprise about 70 persons: 12 for navigation and engineering, 23 for cabin service, 25 for general service (cooks, waiters and waitresses, etc), and ten for entertainment (hosts, gaming room staff).

The airship can be designed for a maximum speed of about 110 km/h and a cruising speed of 100 km/h, preferably using four propulsion engines with thrust propellers and a total power of 4800 kW.

2. Flying Without Ballast and/or Gas Loss

A special advantage of an airship according to the invention relates to the fact that the use of a large helium liquefying plant is not provided for the purpose of compensating loss of weight through fuel consumption and that the new airships include a combustion water recovery plant.

A helium liquefying plant if used with liquefying capacity of about 200 to 500 l/h, with a reservoir tank of at least 10 m³ of liquid helium that, during normal travel, should always be approximately half full, and that furthermore, for fast vaporization of the helium, is linked to a heat accumulator in the form of a condenser containing at least half a cubic meter of hot water, so that, when needed for more lift, liquid helium vaporizes fast through the heat accumulator and can be filled into the connected gas cells, while, when needed for more downward drift, helium is liquefied by the helium liquefying plant, whereby the power requirement of the plant of about 200 to 500 kW, depending on size, can be covered by coupling it to one or more of the propulsion engines.

Figure 7:
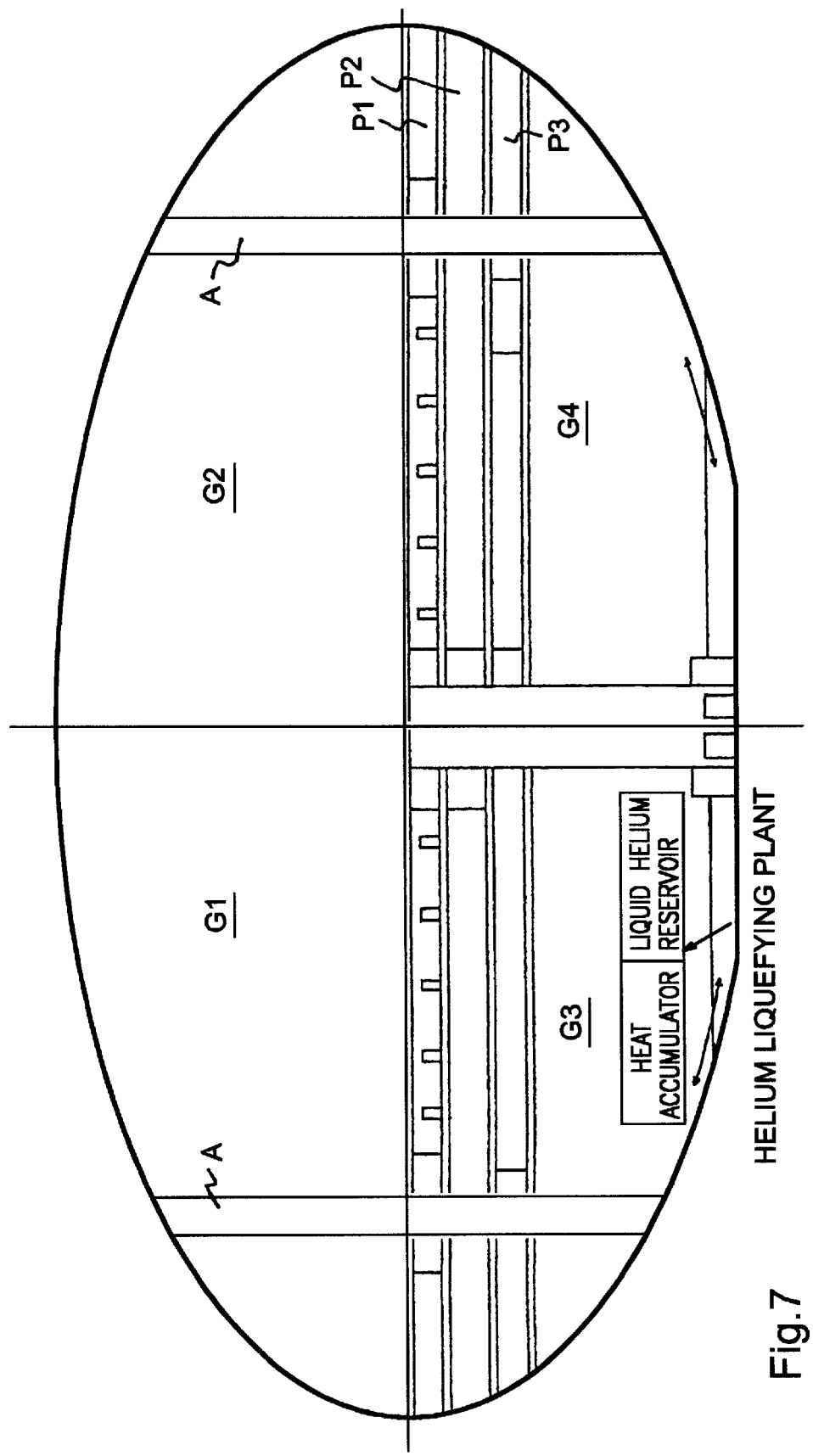

A comparatively small helium liquefying plant of about 200 to 500 l/h is provided, which is very valuable during travel when, in the case of light katabatic or anabatic winds, for climbing to avoid mountain ranges, or when traveling through regions with strong fluctuations of atmospheric temperature, no ballast has to be ejected or gas released, and equally valuable as a landing or starting aid. The plant is shown in FIG. 7 and includes a heat accumulator device for accelerated vaporization and a reservoir for liquid helium.

Even the smaller plant of 200 l/h can generate a 1 m$^3$ supply of liquid helium during the last five hours before landing, for example, this being useful during landing and, through its vaporization when starting, produces lift of almost 1 t. The liquid helium must be pumped through a vaporization chamber "preheated" by liquid nitrogen and then flow through a heat accumulator designed like a condenser, in which water heated to 95° C., for example, is cooled to 20° C. by flowing through the cold helium. The required 55 kWh are to be taken from a heat accumulator of only half a cubic meter, which can be fully recharged again in 5.5 h by an electrical heater. Seeing as 1 t purely static lift when starting means extra climbing speed of 3.8 m/s (Table 1), allowing a gain in altitude of more than 200 m in 1 min, a vertical start is possible.

Similarly, correspondingly high downward drift when landing produces a high speed of vertical descent, which can be braked to zero shortly before landing by the four vertically acting impellers and continuous, fast vaporization of liquid helium.

Such a helium liquefying plant can also be powered while traveling of course, due to its low requirement of about 200 kW (500 kW in the case of the larger plant), by coupling it to a pair of propulsion engines. An airship navigator with foresight will use the topographical data and meteorological readings for the next two to three hours to plan the working of the helium liquefying plant, so that the required extra lift or downward drift is available on time, because the earlier the planning, the smaller the plant can be. This means that a larger plant of about 500 l/h is better when decisions have to be made at short notice. In any case a reservoir of at least 10 m$^3$ capacity of liquid helium is to be provided, which should be half full during normal travel to ensure sufficient reserves for lift or downward drift.

The fact should not be concealed that, for the event of the sudden occurrence of strong vertical turbulence, it will still be necessary to keep emergency ballast for fast ejection (in LZ 129 it was 4 t of water) and, in an emergency, to be prepared to sacrifice a quantity of gas (as small as possible) by limited release in case a sufficient quantity of helium cannot be liquefied fast enough, which is all the more necessary, the smaller the helium liquefying plant is. Once a region of turbulence has been left behind however, the perhaps excessive loss of altitude can be made good by vaporizing helium.

It is suggested, instead of liquefying and revaporizing a relatively small volume of helium, to utilize the cooling and heating of a correspondingly very much greater volume by relatively small temperature differences. Trials of this kind were conducted early on, especially to give an airship that was too heavy on starting greater carrying capacity, by warming the entire hangar with the airship by a few degrees a number of hours before starting. These trials, for various reasons, were soon abandoned however, while experiments in cooling or heating part of the buoyant gas, possibly even during travel, have not become known. These statements only refer to rigid airships, while smaller balloons and blimps even use air warmed by gas burners as their buoyant gas.

The inventive idea for a new solution to this problem consists in connecting part of the buoyant gas in several gas cells G5, G6 laminated with a heat-insulant foam film, which are connected by helium-tight ducts of sufficient cross-section, through a fan to a flow heat exchanger H, which in turn is connected to a refrigerating set that can be switched from refrigerating to heating (as a heat pump).

As an example it is assumed that the volume of helium enclosed in the heat-insulated cells is 100,000 m$^3$ and is to be heated for starting from 15° C. (288 K) by 10° C. The volume then increases at constant pressure by the factor 1.0374 and generates lift of 3.64 t at 1013 mbar atmospheric pressure. If, conversely, the airship is traveling at an altitude of 2000 m (2° C. and 795 mbar) and is cooled by 10° C., the result is a downward drift of 3.14 t.

Heat amounting to 835 MJ has to be extracted from the gas to cool it. If this is achieved in an acceptable time of 1 h, the refrigerating set must produce refrigerating capacity of 232 kW. According to a general dimensioning rule, that the connected load of the set should amount to one third of the refrigerating capacity, this means a connected electrical load of about 80 kW. The weight of this helium tempering device H, at about 2 t, is less than one tenth of the alternative helium liquefying plant. The connected electrical load of the system can be derived from the central power plant of the airship. When connected to the cooling water circuit of the airship, the heat of the set, which is to be transported away or absorbed, only produces a temperature change of about 20° C. at a rate of flow of 10 m$^3$/h, which has no significant effect on the tempering of the helium.

3. Landing and Anchoring

What follows is a new method for landing and anchoring large rigid airships with a description of the necessary devices for the purpose in different examples of implementation, in which the difficulties mentioned earlier on are avoided entirely and passenger transportation on a large scale first really becomes possible.

The inventive idea is characterized for the most part by the fact that the airship lands on a sufficiently large and thick iron plate lying on the ground or bound to it and is frictionally connected to the ground by switching on the current for two or more electromagnets firmly connected to the airship. In the technical description later on of the devices necessary for this method, quantitative estimates are used to show that the method is actually viable and economically attractive. The major prerequisite is that the breakaway forces of the magnets should be so high that even the strongest gusts of wind to be expected against the, because of its large area, especially sensitive broadside of the airship will not cause the magnets to break away from the ground plate. Furthermore, the reduction in load, eg through descent of the passengers (300 passengers weighing 80 kg each with 20 kg of baggage mean 30 t less weight= lift), must also be compensated by the holding force of the magnets.

The landing procedure is to be conducted so that the airship, hovering vertically above the landing platform, comes to within about 1 m of the ground through the effect of the impellers, so that then, by increasing the current through the magnets, it closes fast with the ground plate, whereby a number of shock absorbers with a progressive characteristic, arranged around the magnets, will guarantee a soft touchdown so that the structure of the airship is not subjected to any excessive stress and the passengers and crew are not indisposed. These shock absorbers are extended for landing and are retracted during travel.

Figure 5:
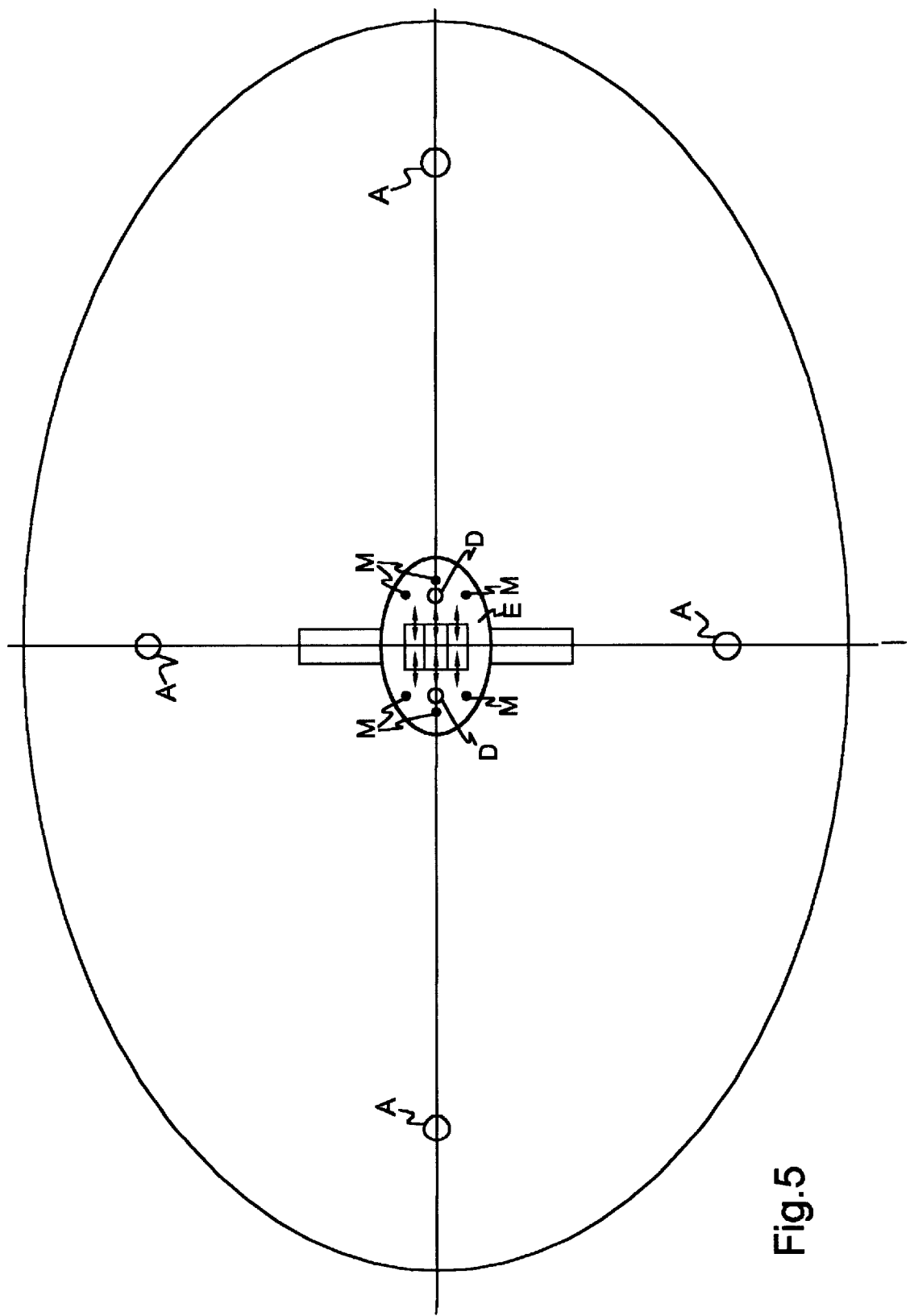
FIG. 5: a schematic view of an airship according to the invention from below.
Figure 6:
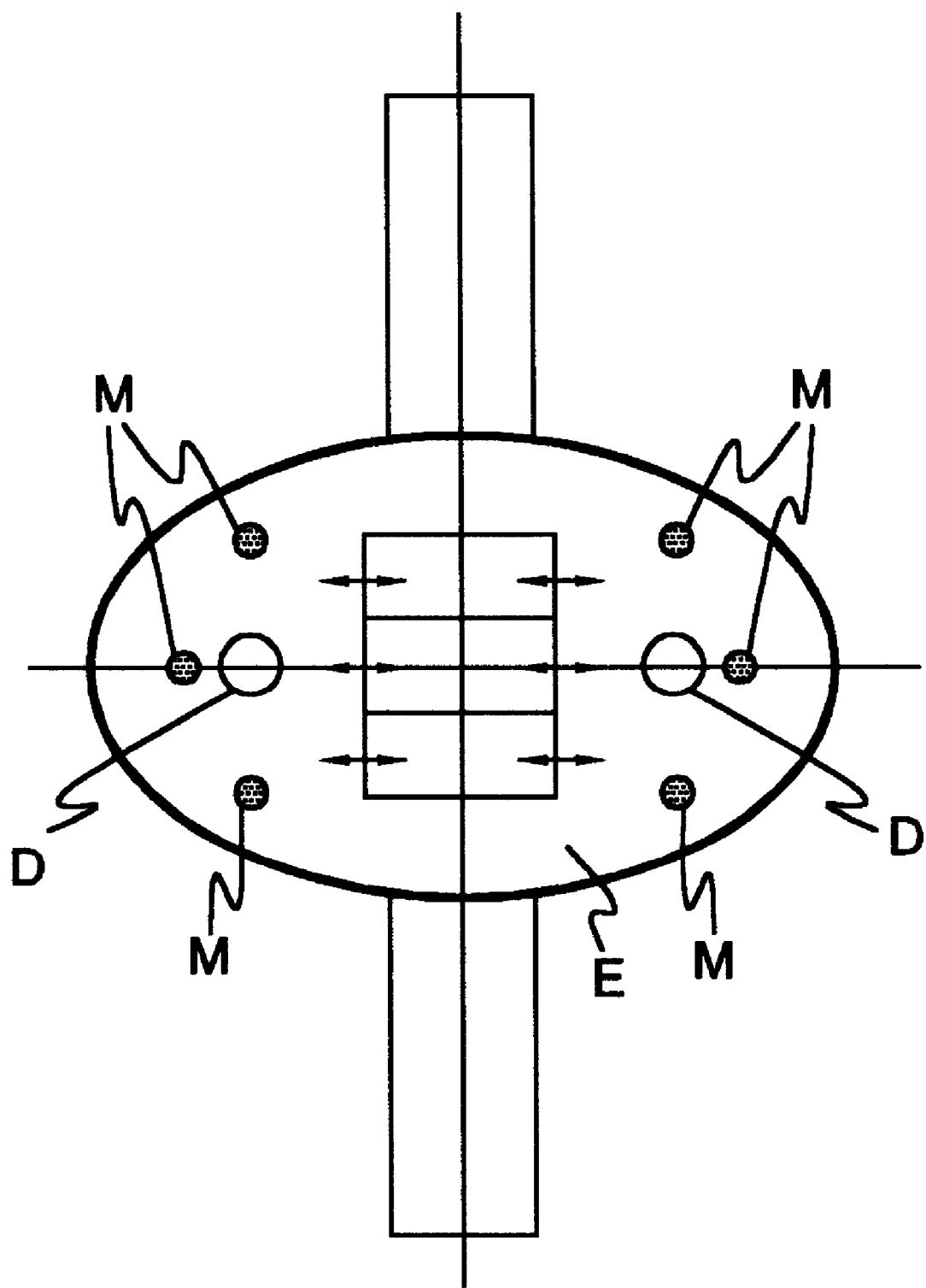
FIG. 6: an enhanced illustration of a detail of FIG. 5, and FIG. 7: a sectional view of an airship according to the invention illustrating further details of the airship.

The device of the invention consists of the magnets M as shown in FIGS. 5 and 6 in the airship and the mooring plate.

To produce an even surface on which the airship can touch down, the surface of EL 1 in its bottommost region differs somewhat from the perfect ellipsoid in that, parallel to the center plane, there is a flat elliptical surface E (flattening) with a large semi-axis of about 12 m. At the front and rear ends of this surface, the two magnets are incorporated so that their magnetically active surfaces are precisely flush with the landing surface of EL 1 just described, ie so that no extra aerodynamic drag is produced. The magnets concerned here are pot-shaped magnets, which are produced commercially as so called lifting magnets. These further details are taken from the catalog of the firm Wagner KG Magnetbau of D-87751 Heimertingen. For example, two magnets can be incorporated that, with a diameter of 1.35 m, height of 28 cm and weight of 1650 kg, exhibit a breakaway force of 300 kN (corresponding to about 30 t in weight) even with a 4.5 mm air gap between the active magnet plane and the mooring plate. The excitation power for this purpose is just 8.8 kW for feeding with 220 $V_{dc}$. The above mentioned descent of 300 passengers produces lift of about 300 kN, while a cross wind gust of 100 km/h results in just 192 kN lateral pressure (Table 1). Consequently these two magnets are fully adequate for magnetically anchoring EL 1 to the ground plate.

The use of at least two magnets of this scale presents several advantages. If the electrical control and feed for each magnet is separate and one magnet fails or partially fails, normal operation can to a high degree of probability be secured until completion of repair of the device. According to the general redundancy principle for increasing the operational safety of technical installations, this function could be implemented even better by using three smaller magnets with the same sum performance, as will be seen below.

This configuration with at least two magnets spaced about 20 m apart also allows passengers with pacemakers to descend and go aboard, as well as those carrying items like notebooks or cassette recorders that are sensitive to electromagnetic radiation, without any risk to persons or property if the door is located in the middle, between the magnets, outside their leakage fields.

An especially advantageous embodiment uses three smaller magnets M with the above mentioned extra safety compared to two magnets. A further advantage is the reduction of the, admittedly slight, risk of pitch caused by a violent cross wind gust, since this is created on the entire lateral surface, because, if the magnets are arranged accordingly, the pitch can be fully absorbed. Such an arrangement would see one magnet at the rear end of the landing surface of the airship (as in the dual-magnet arrangement), while the other two would be placed at the same distance right and left of the center line at the edge of the landing surface and approximately 3 m from its front end. For this configuration the catalog of the above mentioned firm lists magnets with a diameter of 1 m, breakaway force of 192 kN at 3 mm air gap and 700 kg in weight. This presents yet another advantage in that the mooring plate may be much thinner. The optimum thickness is about one twelfth of the diameter of the magnet, so in this way one quarter of the weight of the mooring plate can be saved compared to the arrangement with two magnets. Alternatively the argumentation can be extended to use of a larger number of magnets. Optimization in a concrete application will require reference to the standard specifications for the method stated here. The use of several smaller magnets can considerably simplify the statics mission of adequate attachment of the magnets in the framework of the airship. This is possible in various ways without venturing away from the sphere of the invention outlined here.

A circular flat plate of low-carbon steel (eg St 34 or St 37), of parts assembled on site and best laid in a concrete foundation, with the above mentioned thickness as a function of magnet diameter and itself with a diameter of approx. 30 m, will suffice as the anchoring plate. For the farthest spacing of the magnets from the center of the landing surface of the airship, this diameter will guarantee sufficient maneuverability of about 5 m in all directions, which means that the precision of landing by the method described can be achieved without further ado. The surface is best painted with daytime phosphorescent paint, for example, to visually support location and landing, although normally this should not be necessary if radar is used.

Instead of laying the anchoring plate on firm ground, it is of course also possible to lay it on pontoons that are anchored and linked together. The platform resulting in this way can be anchored alongside a harbor quay so that passengers are easily able to cross between a cruise airship and a sea cruiser.

The advantages of the method, utilizing the special features of the device described for implementing it, are obvious. Above all, there are no elaborate installations at the landing point, just a simple mooring plate, and no ground personnel, so remote points almost anywhere in the world can be used to land. In this way the economic attractiveness of airship operations is enhanced extraordinarily, and the safety of mooring given by the frictional connection between the airship and the mooring plate increases substantially compared to the former methods described above, since the holding force against changes in lift and wind pressure, easily specified for each airship, can be maintained electromagnetically with a sufficiently high safety factor.

Normally a cruise airship will land on an iron plate, dimensioned accordingly, by the electromagnetic mooring device described. But in exceptional cases the cruise airship may be forced to make an emergency landing somewhere in open terrain, where there is no mooring plate of course. For such situations a device should be available that in the majority of cases will allow safe landing/mooring and descent of the passengers without risk or danger.

The inventive idea is to ensure this by two or more earth augers D as shown in FIGS. 5 and 6 about 5 m in length, firmly mounted at descent level in the vicinity of the electromagnets so that they can bore down vertically into the ground through an opening in the floor of the descent level until sufficiently good hold is achieved. This can be simplified by appropriate shaping of the drill spirals and making the m large enough in diameter. Normally such drills will be powered by electromotors, but, for the event that the power plant fails, a very much geared down crank should be provided on each drill that can be operated by at least two men at the same time.

TABLE 1

Comparison between LZ 129 and EL 1

| Characteristic at | LZ 129 | EL 1 | Factor EL 1/LZ 129 |
|---|---|---|---|
| Length | 245 m | 150 m | 0.61 |
| Width | 41.2 m | 100 m | 2.43 |
| Height | 41.2 m | 50 m | 1.21 |
| Volume* | 217,750 m³ | 392,700 m³ | 1.80 |
| Frontal drag (100 km/h) | 37,187 N | 127,795 N | 3.44 |
| Transverse drag (100 km/h) | 583,525 N | 191,694 N | 0.33 |
| Sinking drag (1 m/s) | 756 N | 710 N | 0.94 |
| Sinking velocity | 3.6 m/s | 3.8 m/s | 1.06 |

TABLE 1-continued

Comparison between LZ 129 and EL 1

| Characteristic at | LZ 129 | EL 1 | Factor EL 1/LZ 129 |
|---|---|---|---|
| (10 kN downward drift) | | | |
| Required engine power (100 km/h) | 1033 kW | 3550 kW | 3.44 |
| Installed engine power | 2650 kW | 4800 kW | 1.81 |
| Maximum speed | 137 km/h | 110 km/h | 0.80 |
| Gas cell volume | 190,000 m$^3$ | 275,000 m$^3$ | 1.45 |
| Load | 96 t | >138 t | >1.44 |
| Payload | 7.9 t | 30 t (= 300 persons) | 3.8 |

*Calculated for LZ 129 as rotational ellipsoid with 6:1 axis ratio

What is claimed is:

1. A cruise airship whose hull (S) has the form of an ellipsoid, said ellipsoid having three axes of different lengths at right angles to one another, whereby a longitudinal axis (L), which is horizontally oriented in the position for travel, a transverse axis (Q), which is horizontally oriented in the position for travel and at right angle to the longitudinal axis (L), and a vertical axis (H), which is vertically oriented in the position for travel, possess the longest, middle and shortest length, respectively, wherein the axial sections of the longitudinal axis (L), the transverse axis (Q) and the vertical axis (H) relate according to l:q:h where l is in the range 2.5 to 3.5, q is in the range 1.5 to 2.5, and h is in the range 0.5 to 1.5.

2. The airship according to claim 1, wherein near ends of the longitudinal and transverse axes, impellers (A) are arranged to generate controllable impeller propulsion.

3. The airship according to claim 2, wherein near each end of the longitudinal and transverse axes at least one impeller with vertical fan propulsion and near the ends of the longitudinal axis at least one impeller with horizontal fan propulsion are arranged.

4. The airship according to claim 1, wherein an upper half of the hull in the position for travel is filled with gas cells filled permanently with helium and, wherein a lower half of the hull contains helium filled gas cells that are connected to a helium tempering device and whose helium content is variable.

5. The airship according to claim 4, wherein the gas cells in the lower half of the hull are arranged so that a uniformly distributed lifting force is exerted on an upper, flat demarcation of the lower half.

6. The airship according to claim 1, wherein one or more passenger decks are located in an upper third of the lower half of the hull.

7. The airship according to claim 6, wherein the hull has a skin cladding of metal that in the region of the passenger decks, at least in part, is replaced by transparent walling.

8. The airship according to claim 1, wherein l:q:h=3:2:1.

9. The airship according to claim 1, wherein a helium liquefying plant is provided that has a heat accumulator device for accelerated vaporization and a reservoir for liquid helium.

10. The airship according to claim 1, wherein a helium tempering plant is provided that comprises a large number of linked gas cells that are connected to a refrigerating set designed for cooling or heating.

11. The airship according to claim 1, wherein an electromagnetic anchoring device is provided that, in an anchored condition on the ground, forms a force of attraction with a magnetic plate on the ground that is greater than the sum of the breakaway forces at the highest possible wind pressure and the reduction in weight of the airship when the passenger decks are completely emptied.

12. The airship according to claim 11, wherein an underside of the hull has a flat, elliptical flattening parallel to the horizontal plane of symmetry of the hull wherein the mooring device is incorporated.

13. The airship according to claim 12, wherein the flattening has a large semi-axis at whose ends the electromagnets of the mooring device are incorporated.

14. The airship according to claim 12, wherein the flattening has small and large semi-axes, whereby at least three magnets are arranged at the ends of the semi-axes.

15. The airship according to claim 1, wherein several drilling devices are arranged on the underside of the hull for emergency mechanical mooring by which spiral-shaped anchors can be driven into the ground.

16. A cruise airship whose hull (S) has the form of an ellipsoid, said ellipsoid having three axes of different lengths at right angles to one another, whereby a longitudinal axis (L), which is horizontally oriented in the position for travel, a transverse axis (Q), which is horizontally oriented in the position for travel and at right angle to the longitudinal axis (L), and a vertical axis (H), which is vertically oriented in the position for travel, possess the longest, middle and shortest length, respectively, and wherein stabilizing fins (F) are provided that, depending on speed, can be extended or retracted inside the hull (S).

* * * * *